(12) United States Patent
Turpin et al.

(10) Patent No.: US 6,631,874 B2
(45) Date of Patent: Oct. 14, 2003

(54) ADJUSTABLE FIBER OPTIC CABLE TROUGH BRACKET

(75) Inventors: Timothy McBrien Turpin, Liberty Lake, WA (US); Steven W. Ellison, Mead, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 09/873,009

(22) Filed: Jun. 1, 2001

(65) Prior Publication Data

US 2002/0179779 A1 Dec. 5, 2002

(51) Int. Cl.[7] .................................................. F16L 3/00
(52) U.S. Cl. ........................ 248/49; 248/218.4; 248/235
(58) Field of Search ............................. 248/65, 70, 72, 248/73, 214, 223.31, 227.4, 228.5, 230.3, 242, 225.11, 48.1, 48.2, 49

(56) References Cited

U.S. PATENT DOCUMENTS

| | | | |
|---|---|---|---|
| 290,103 A | * | 12/1883 | Paul |
| 593,719 A | * | 11/1897 | Fuller |
| 1,091,942 A | * | 3/1914 | Mather |
| 1,571,277 A | * | 2/1926 | Knab |
| 1,714,006 A | * | 5/1929 | Eilenberg |
| 2,147,799 A | * | 2/1939 | Reynolds |
| 2,448,750 A | * | 9/1948 | Van Wert |
| 2,597,255 A | * | 5/1952 | Morgan et al. |
| 2,634,929 A | * | 4/1953 | Kumpf |
| 2,686,960 A | * | 8/1954 | Le Roy |
| 3,106,271 A | * | 10/1963 | McGee |
| 3,561,714 A | | 2/1971 | Zurawski et al. |
| 4,059,248 A | | 11/1977 | Kuntz |
| 4,065,088 A | | 12/1977 | Shell |
| 4,299,362 A | | 11/1981 | Buluschek et al. |
| 4,700,916 A | | 10/1987 | Bastian et al. |
| D294,221 S | | 2/1988 | Sheftel ........................ D8/381 |
| 5,240,234 A | * | 8/1993 | Lee |
| 5,316,244 A | | 5/1994 | Zetena, Jr. |
| 5,575,444 A | | 11/1996 | Otema |
| 5,816,550 A | * | 10/1998 | Watanabe et al. ....... 248/222.11 |
| 5,871,191 A | | 2/1999 | Cohn |
| 6,412,733 B1 | * | 7/2002 | Grzemski ..................... 248/49 |

* cited by examiner

Primary Examiner—Korie Chan
(74) Attorney, Agent, or Firm—Wells St. John P.S.

(57) ABSTRACT

An adjustable fiber optic cable trough bracket with a bracket mount structure configured to mount to a facilities support structure, a bracket with a first end, a second end, and a trough support surface, the bracket being pivotally mounted at its first end to the bracket mount structure at a bracket angle, an adjustment screw threaded into one of the bracket mount structure and the bracket, an end of the adjustment screw abutting the other of the bracket mount structure and the bracket; wherein rotation of the adjustment screw alters the bracket angle. An embodiment of the bracket may also be installed from one side of the facilities support utilizing open ended apertures in the bracket mount structure.

9 Claims, 7 Drawing Sheets

ADJUSTABLE FIBER OPTIC CABLE TROUGH BRACKET

TECHNICAL FIELD

This invention pertains to a bracket system for adjustably supporting fiber optic cable raceways and troughs to facilitate the adjustable retention.

BACKGROUND OF THE INVENTION

In the telecommunications industry there are numerous locations where a significant amount of fiber optic cable must be routed within the facility or from one facility to another. The routing within the facility may be from one piece of equipment to another or even from outside lines coming into a central office, and to connectors where the lines are connected to equipment within the facility.

There are typically a large number of fibers and all the fibers must be handled with care to avoid damage to the fiber optic cable, which would hinder its performance. In a typical facility, fiber optic troughs are normally used to carry or route the fiber optic cables. In many facilities, the troughs or raceways are located overhead and over the locations of the fiber optic distribution frames, bays and equipment.

In certain types of facilities, a significant number of troughs are needed to contain and route the fiber optic cables, and the installation time and expense can be substantial.

After a fiber optic trough is mounted, which typically occurs on brackets, fiber optic cable is loaded within the troughs. Over time the existing brackets tend to settle and also sag, which likewise causes the fiber optic cable troughs to sag or be held at an angle. The problem is furthered by the addition of more fiber optic cables to the trough after it is initially installed.

It is an object of this invention to provide a system which reduces the sag of fiber optic cable brackets for fiber optic cable raceways and troughs and which provides for the subsequent adjustment of the bracket angle to continually maintain the fiber optic cable raceways and troughs at a predetermined desired bracket angle.

BRIEF DESCRIPTION OF THE DRAWINGS

Preferred embodiments of the invention are described below with reference to the following accompanying drawings.

FIG. 3 is an elevation view of the embodiment of the invention illustrated in FIG. 1;

DETAILED DESCRIPTION OF THE PREFERRED EMBODIMENT(S)

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The term screw as used herein, such as in "adjustment screw" is intended to mean not only a traditional screw, but also any threaded member which when rotated, moves at least in the axial direction.

Figure 1:
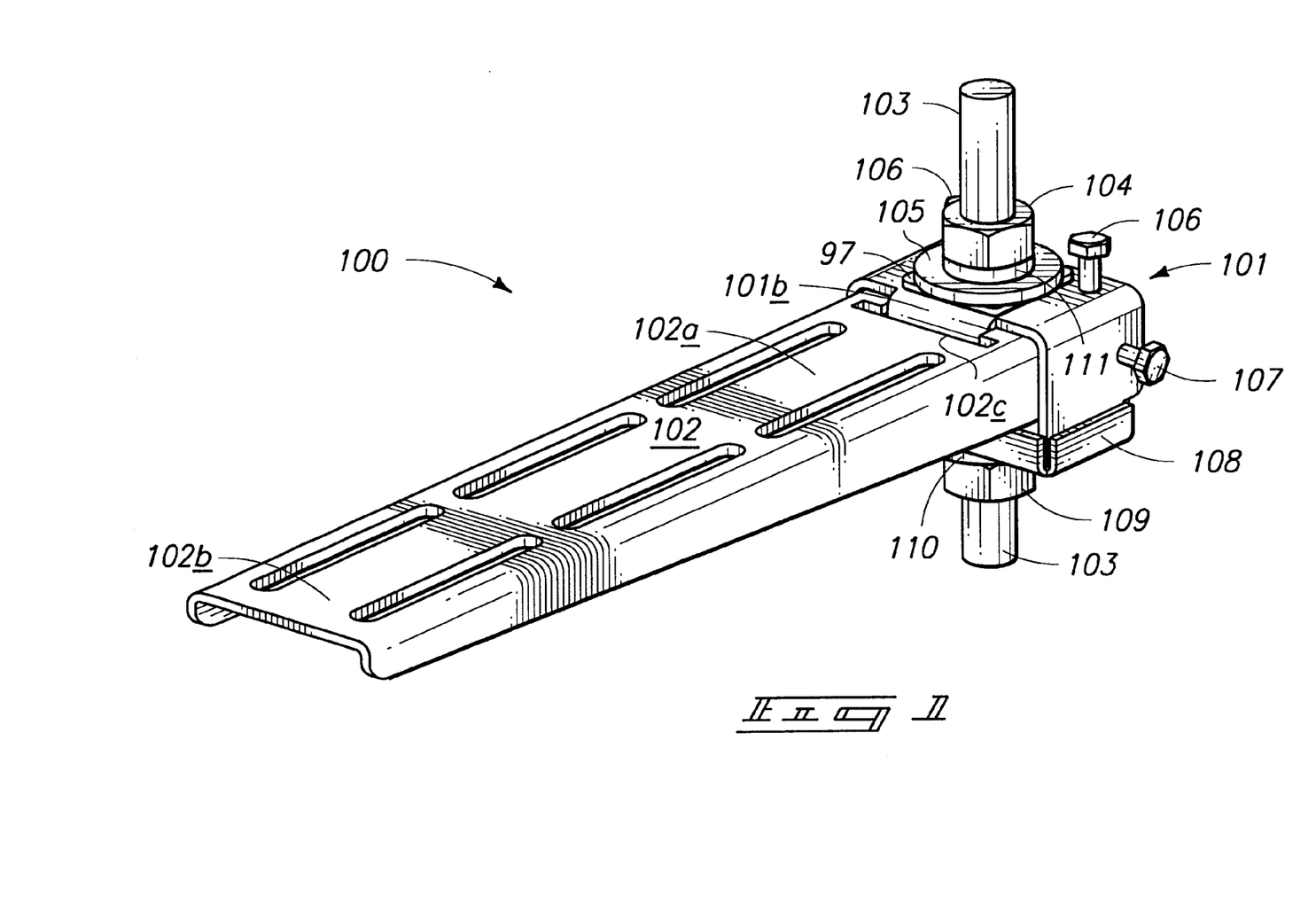
FIG. 1 is a perspective view of one embodiment of a bracket system as contemplated by this invention, as mounted to an all-thread type of support.

FIG. 1 is a perspective view of one embodiment of this invention as mounted to a typical all-thread support structure found in many telecommunications facilities. FIG. 1 illustrates support bracket system 100 with bracket 102 with first end 102a, and second end 102b. The top surface shown is the surface upon which a fiber optic cable trough or raceway may be placed and thereby supported.

FIG. 1 illustrates bracket mount structure 101 which is configured to mount bracket 102 to any one of a number of supports in a telecommunication facility, such as all-thread support 103. Bracket mount structure 101 is supported by mount cradle 108 on bolt 106 with washer 110 between mount cradle 108 and bolt 109. Bracket mount 101 has bracket mount tongue 101b which interlocks with tongue aperture 102c in bracket 102. Yoke plate 97 is partially shown, but is shown and described more fully in FIGS. 4 & 6.

The combination of the abutment of the first end 102a of the bracket 102 and the interlocking of tongue 101b with tongue aperture 102c provides for pivoting of bracket 102 relative to all-thread support 103 and relative to bracket mount 101. Adjustment screw 106 is provided through bracket mount 101 and the terminal end of adjustment screw 106 abuts a surface of bracket 102. The abutment may occur either directly or indirectly. The turning of adjustment screw 106 thereby causes the pivoting of bracket 102 about an axis at or near tongue 101b.

The top of bracket mount 101 is further secured by bolt 104, washer 105 and lock washer 111. The combination of bolt 104 and bolt 109 securely locate bracket 102 in the desired location.

While adjustment screw 106 is shown in the vertical orientation above the bracket mount structure 101, it may be in a number of different positions, such as on the underside of the bracket mount structure 101, or may even be horizontally oriented with a differently configured bracket mount structure 101.

Figure 2:
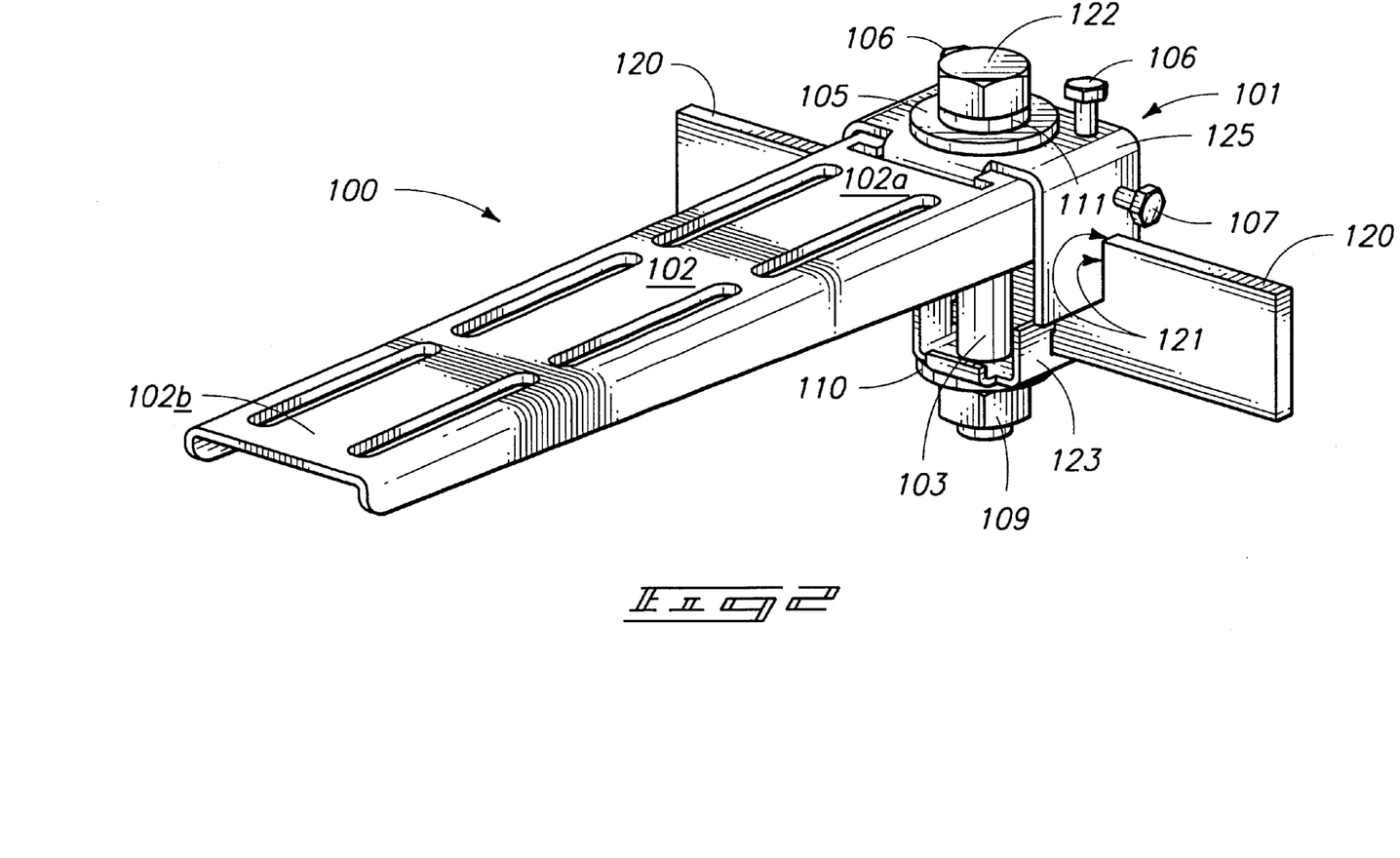
FIG. 2 is a perspective view of another embodiment contemplated by this invention, mounted to a horizontal bar-type mounting structure.

FIG. 2 is another perspective view of a bracket system as contemplated by this invention, only mounted to horizontal bar support 120, which is a type or configuration of support found in many telecommunications facilities. All like numbered items are the same as described and numbered in FIG. 1.

FIG. 2 illustrates horizontal bar support 120, top bolt 122, bottom bolt 109, horizontal bar mount cradle 123, washer 110, and adjustment screws 106. Horizontal mount bar 120 fits within horizontal bar aperture 121 in mount bracket 125. Bracket mount 125 is configured for a horizontal bar mounting as horizontal bar mount aperture 121 is configured for the horizontal bar 120.

Horizontal bar mount cradle 123 is likewise configured to receive the bottom side of horizontal bar 120 and bolts 122 and 109 may be used to secure the bracket system 100 to the horizontal bar 120.

It will further be noted that two set screws are shown in FIG. 2 and are preferred for the adjustment of the bracket angle, as shown more fully in later figures. Screw 107 provides additional tightening and securement of the connection between bracket 102 and bracket mount 125.

FIG. 3 is an elevation view of a bracket system as contemplated by this invention, with a horizontal fiber optic cable raceway or trough 140. Fiber optic cable raceway 140 includes bottom surface 140a, first side surface 140b and second side surface 140c. Bottom surface 140a is supported by and sits on bracket 102. Any given longitudinal trough may require or best work on a bracket 102 with a support piece or bracket interface, depending on the embodiment and the application. Bracket 102 has first end 102a and second end 102b, with first end 102a being pivotally mounted or attached to bracket support 101, as described more fully above.

FIG. 3 further shows all-thread 103, adjustment screw 106, screw 107, lock washer 111, washer 105, lock washer 112 and washer 110. Bolts 104 and 109 may be utilized to locate, tighten and secure bracket 102 into the desired location. Yoke plate 97 is partially shown, but is shown and described more fully in FIGS. 4 & 6.

FIG. 3 further illustrates bracket angle 147, which preferably retains fiber optic cable raceway or trough 140 at a horizontal position.

Sometimes the bending or non-vertical alignment of all-thread support 103 requires bracket angle 147 to be at a different angle to maintain fiber optic cable trough 140 in the desired location. It would also be noted that the desired location may be different than horizontal and may require further adjustments to bracket angle 147 to achieve the desired result.

Figure 4:
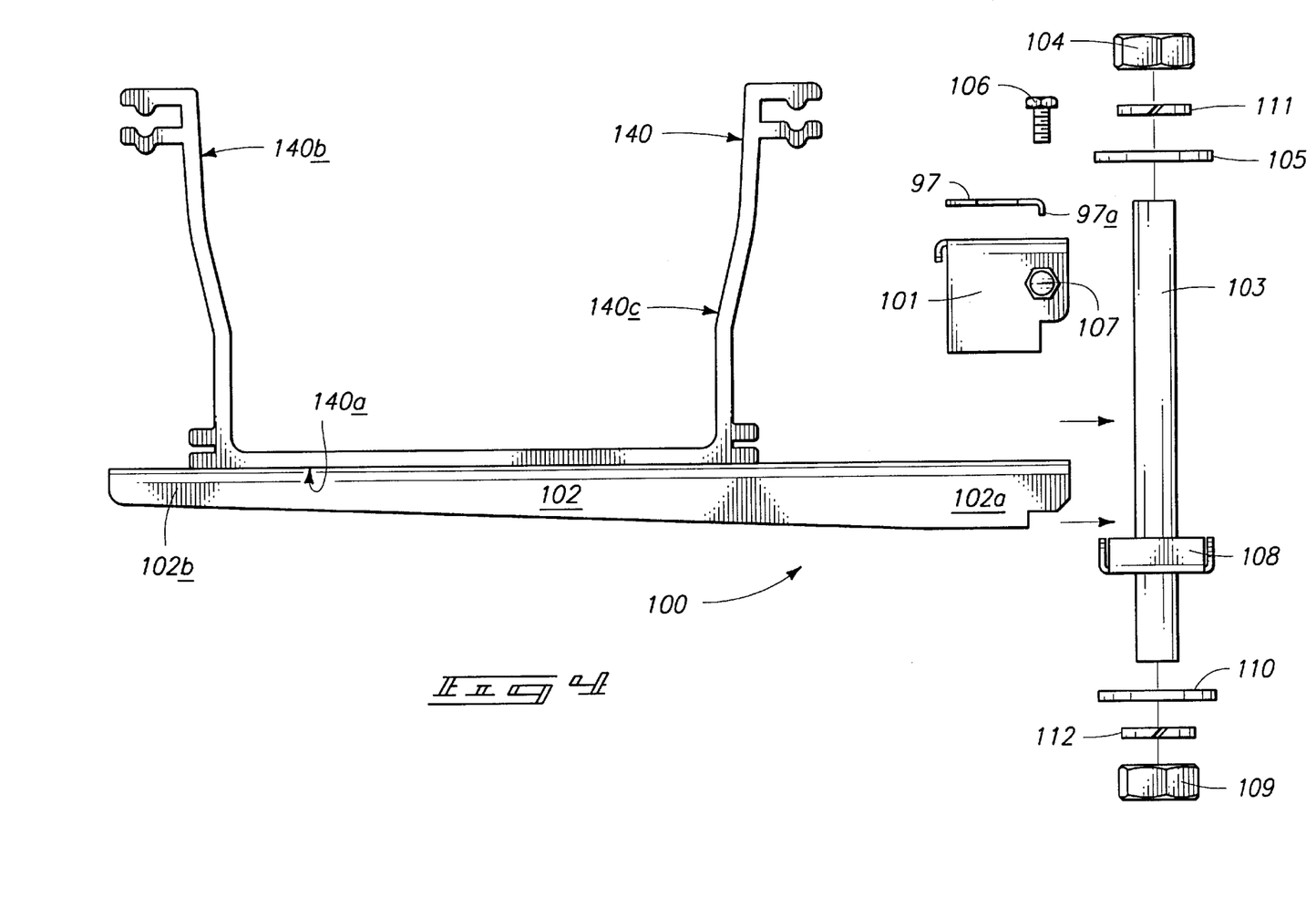
FIG. 4 is an exploded elevation view of the embodiment of this invention illustrated in FIG. 1.

FIG. 4 is an exploded view of the embodiment of the invention shown in FIG. 3, with like number referring to like components. Each item will not therefore be recited again here.

FIG. 4 further illustrates how bracket system 100 may be installed or assembled on existing all-thread support 103 without disassembling or removing the all-thread support. This is accomplished through the design, providing apertures which may be slid onto and around all support 103 and need not be installed from the top or bottom of all-thread support 103. This is explained and illustrated more fully in FIG. 6. FIG. 4 also shows yoke plate 97 with insert portion 97a. Yoke insert portion 97a and where it inserts in bracket mount 101 is more fully shown in FIG. 6.

Figure 5:
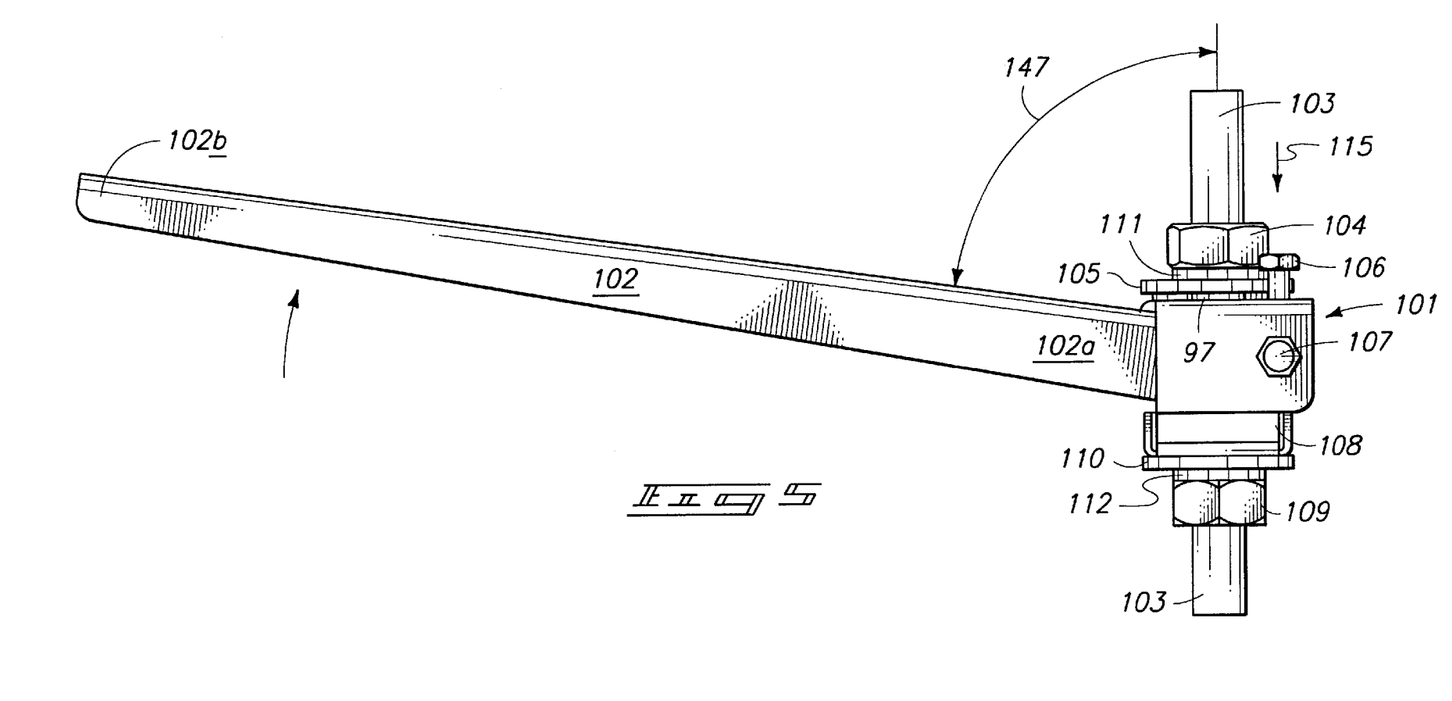
FIG. 5 is an elevation view of the embodiment of this invention illustrated in FIG. 1, wherein the bracket angle has been changed from that shown in FIG. 1.

FIG. 5 is an elevation view of the embodiment of this invention illustrated in FIG. 3, only showing that bracket angle 147 has been adjusted by the pivoting of bracket 102 with respect to bracket mount 101. Arrow 115 illustrates that adjustment screw 106 has been axially turned to cause it to move downward. The downward movement of adjustment screw 106 imparts a force on first end 102a of bracket 102 on the support side of the axis about which bracket 102 pivots. This causes the second end 102b of bracket 102 to move upward and thereby adjusts the bracket angle of fiber optic cable trough or raceway that may be supported by bracket 102. Yoke plate 97 is partially shown, but is shown and described more fully in FIGS. 4 & 6.

All other items numbered in FIG. 5 are like items to those in FIG. 4 and will not therefore be repeated herein.

Figure 6:
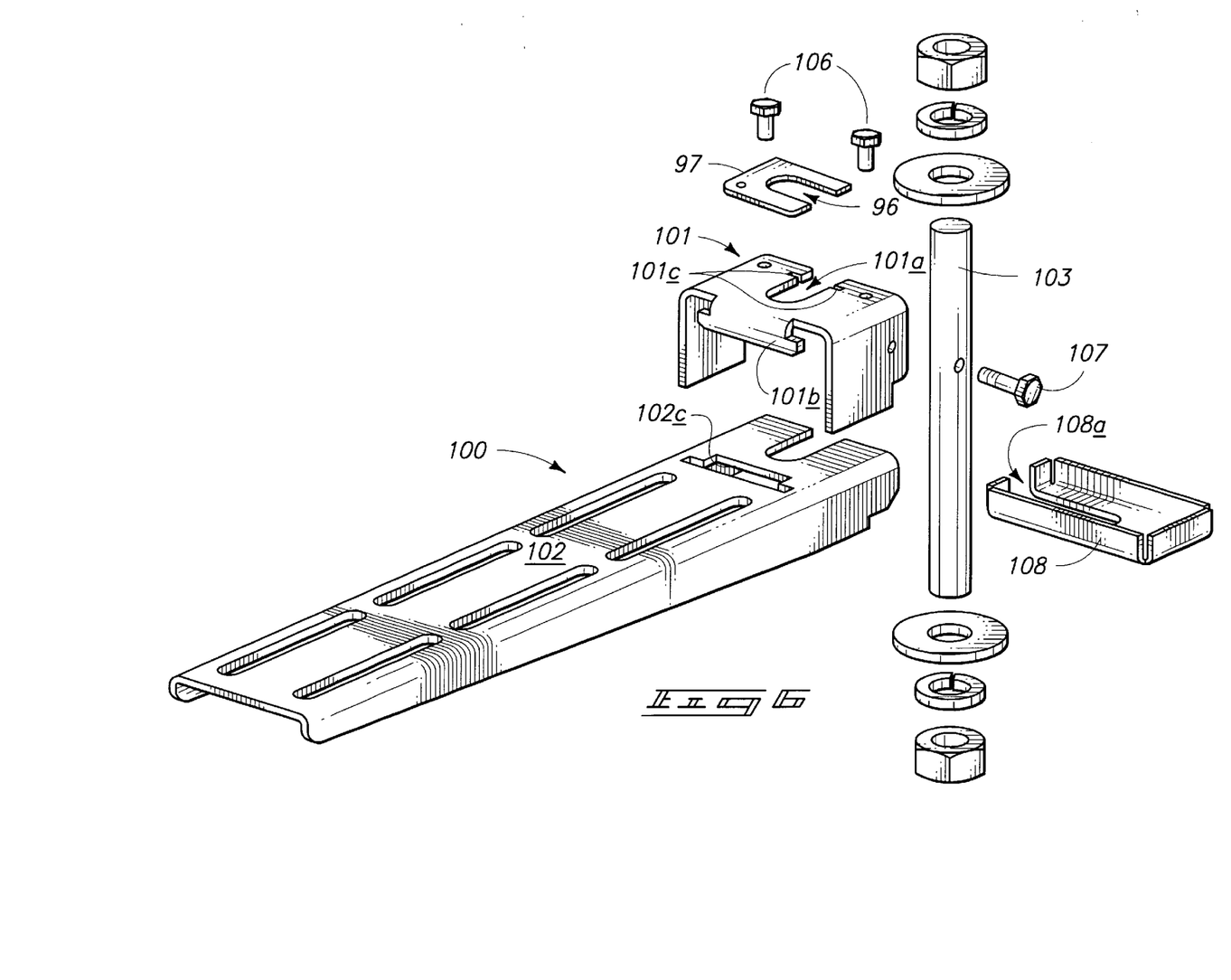
FIG. 6 is an exploded perspective view of the embodiment of this invention shown in FIG. 1.

FIG. 6 is an exploded perspective view of the embodiment of the invention shown in FIG. 1, as may be mounted to all-thread support 103. FIG. 6 illustrates various mounting features which may be included in embodiments of this invention and which allow it to be installed to existing all-thread supports without moving or disassembling the all-thread support 103.

Mount bracket cradle 108 is shown with elongated aperture 108a which slides around all-thread support 103. Bracket mount 101 is shown with tongue 101b which inserts into tongue aperture 102c to provide pivotal movement of bracket 102 with respect to bracket mount 101 and all-thread support 103. Bracket mount 101 further includes bracket mount aperture or open support structure aperture 101a, which may be horizontally moved to place it around the vertical all-thread support structure 103, to mount and assemble the bracket system 100 on the vertical all-thread support structure 103.

FIG. 6 further shows yoke plate 97 with opening 96 therein. The insert portion (shown in FIG. 4) of yoke plate 97 is a tab or lip which corresponds to and insert into the yoke plate aperture 101c in bracket mount 101. Yoke plate 97 may be horizontally moved such that support 103 is positioned within opening 96. Yoke plate 97 is then lowered so that the insert portion 97a (shown in FIG. 4) fits within yoke plate aperture 101c in bracket mount 101. The yoke plate 97 of bracket mount 101 is one way the bracket mount may be secured to support 103, within the contemplation of this invention.

Figure 7:
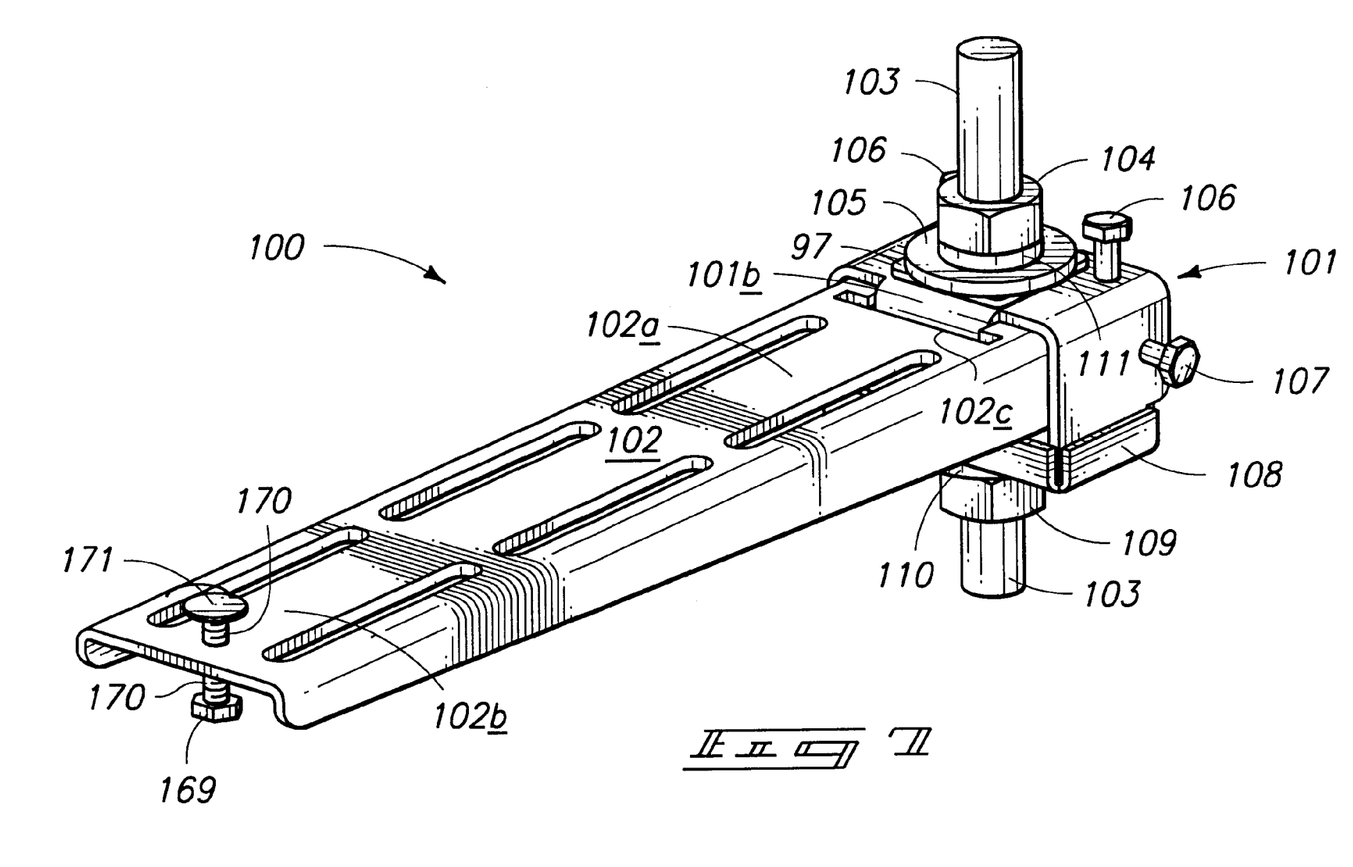
FIG. 7 is a perspective view of another embodiment of this invention wherein an adjustment screw is provided at the second end of the bracket to provide partial or whole adjustment of a bracket angle.
Figure 11:
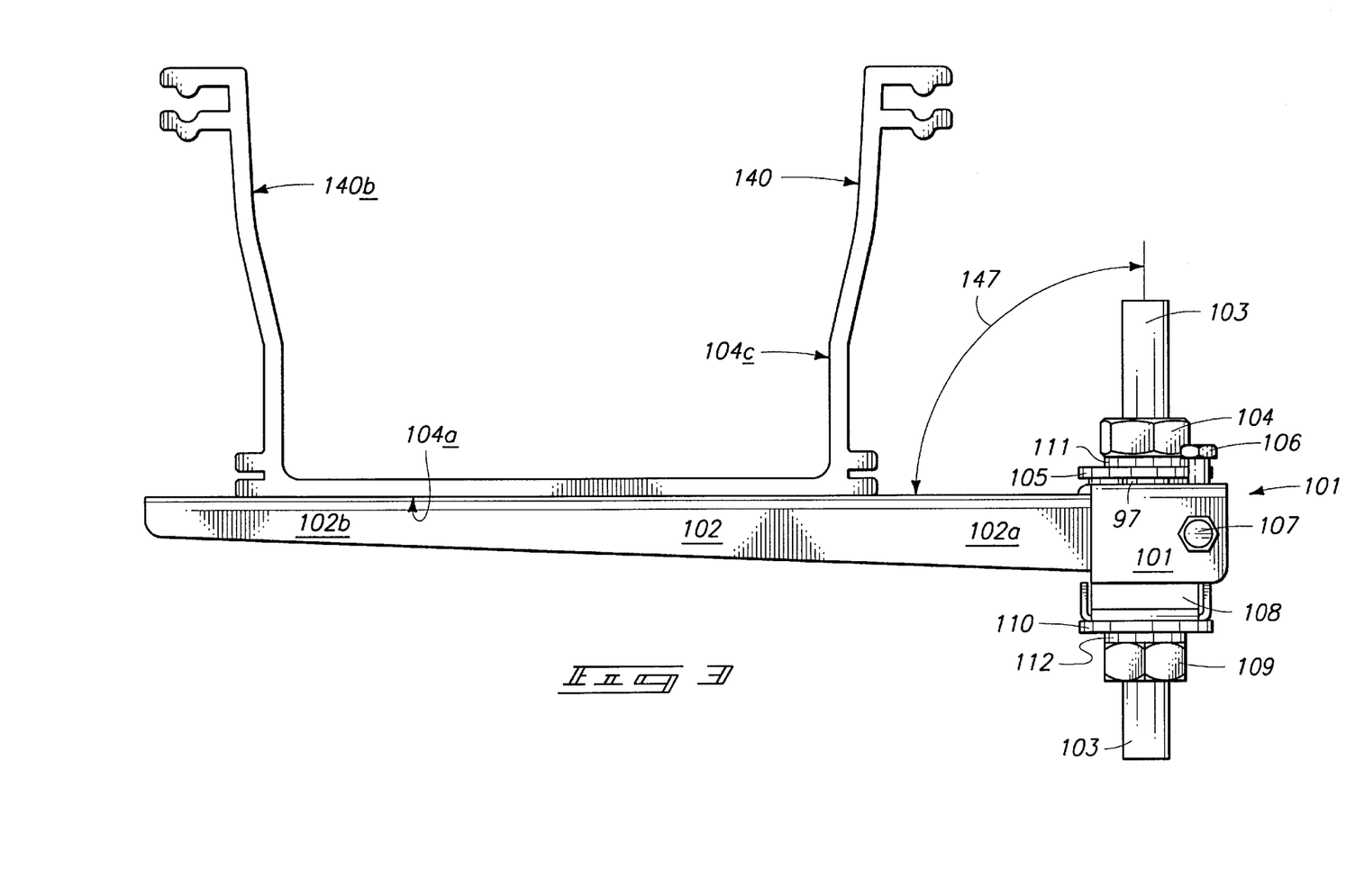

FIG. 7 is a perspective view of another embodiment of this invention which provides for the adjustment of the bracket angle, illustrating bracket 102, adjustment screw 170 and adjustment screw support 171. Adjustment screw 170 is inserted through a threaded aperture in 102a to provide for axially rotation of adjustment screw 170. The rotation of adjustment screw 170 causes adjustment screw support 171 to move vertically upward or downward. Adjustment screw support 171 would preferably be positioned directly beneath the outer side of a fiber optic cable raceway or trough placed upon and supported by bracket 102. This provides for the adjustment of the bracket angle. Adjustment screw 170 may have bolt head 169 to provide a better means of rotating adjustment screw 170 to a desired location. Yoke plate 97 is partially shown, but is shown and described more fully in FIGS. 4 & 6.

As will be appreciated by those of reasonable skill in the art, there are numerous embodiments to this invention, and variations of elements and components which may be used, all within the scope of this invention.

One embodiment of this invention for example is a fiber optic cable trough bracket comprising: a bracket mount structure configured to mount to a support structure; a bracket with a first end, a second end, and a trough support surface, the first end of the bracket being pivotally mounted to the bracket mount structure at a bracket angle; an adjustment screw threaded into one of the bracket mount structure and the bracket, a terminal end of the adjustment screw abutting the other of the bracket mount structure and the bracket; and wherein rotation of the adjustment screw alters the bracket angle.

A further embodiment is wherein the adjustment screw is vertically oriented such that when it is rotated about its axis, the adjustment screw moves in the vertical direction.

In another embodiment of this invention, the bracket mount structure includes an open support structure aperture, such that the bracket mount structure may be installed on a vertical support structure by horizontal movement of the bracket mount structure around the support structure.

In another embodiment of the invention, a fiber optic cable trough bracket comprises: a bracket mount structure configured to mount to a support structure; a bracket with a first end, a second end, and a trough support surface, the first end of the bracket being pivotally mounted to the bracket mount structure at a bracket angle; an adjustment screw threaded into one of the support structure and the bracket, a terminal end of the adjustment screw abutting the other of the support structure and the bracket; and wherein rotation of the adjustment screw alters the bracket angle. This embodiment may further be a bracket wherein the bracket mount structure includes an open support structure aperture, such that the bracket mount structure may be installed on a vertical support structure by horizontal movement of the bracket mount structure around the support structure.

In yet another embodiment of the invention, a fiber optic cable trough bracket is comprised of: a bracket mount structure configured to mount to a support structure; a bracket with a first end, a second end, and a trough support surface, the first end of the bracket being pivotally mounted to the bracket mount structure at a bracket angle; a fiber optic cable trough supported on the bracket; an adjustment screw threaded into one of the trough and the bracket, a terminal end of the adjustment screw abutting the other of the trough and the bracket; and wherein rotation of the adjustment screw alters the bracket angle. This embodiment may also be utilized wherein the bracket mount structure includes an open support structure aperture, such that the bracket mount structure may be installed on a vertical support structure by horizontal movement of the bracket mount structure around the support structure.

In yet another embodiment, a fiber optic cable trough bracket is provided which comprises: a means to mount the bracket to a support structure; a trough support means with a first end, a second end, the first end of the trough support means being pivotally mounted to the means to mount the bracket to a support structure, at a bracket angle; an adjustment means on one of the means to mount the bracket and the trough support means; and wherein adjusting the adjustment means alters the bracket angle.

It should be appreciated that there are also method embodiments of this invention, such as a method for the assembly of an adjustable fiber optic cable trough bracket on a vertical facility support structure, comprising the following steps: providing a bracket mount structure with an open support structure aperture; providing a bracket with a first end, a second end, and a trough support surface; pivotally mounting the bracket to the bracket mount structure; horizontally moving the bracket mount structure around the vertical facility support structure; and securing the bracket mount structure to the vertical facility support structure.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I/We claim:

1. A fiber optic cable trough bracket, comprising:
   a bracket mount structure configured to mount to a support structure;
   a bracket with a first end, a second end, and a trough support surface, the first end of the bracket being pivotally mounted to the bracket mount structure at a bracket angle;
   a vertically oriented adjustment screw threaded into one of the bracket mount structure and the bracket, a terminal end of the adjustment screw abutting the other of the bracket mount structure and the bracket; and
   wherein rotation of the adjustment screw alters the bracket angle; and further wherein the bracket is cantilever mounted at the first end to the bracket mount structure.

2. A fiber optic cable trough bracket as recited in claim 1, and further wherein the adjustment screw is vertically oriented such that when it is rotated about its axis, the adjustment screw moves in the vertical direction.

3. A fiber optic cable trough bracket as recited in claim 1, and further wherein the bracket mount structure includes an open support structure aperture, such that the bracket mount structure may be installed on a vertical support structure by horizontal movement of the bracket mount structure around the support structure.

4. A fiber optic cable trough bracket, comprising:
   a bracket mount structure configured to mount to a support structure;
   a bracket with a first end, a second end, and a trough support surface, the first end of the bracket being pivotally mounted to the bracket mount structure at a bracket angle and wherein t e bracket is cantilever mounted at the first end to the bracket mount structure;
   a vertically oriented adjustment screw threaded into one of the support structure and the bracket, a terminal end of the adjustment screw abutting the other of the support structure and the bracket; and
   wherein rotation of the adjustment screw alters the bracket angle.

5. A fiber optic cable trough bracket as recited in claim 4, and further wherein the bracket mount structure includes an open support structure aperture, such that the bracket mount structure may be installed on a vertical support structure by horizontal movement of the bracket mount structure around the support structure.

6. A fiber optic cable trough bracket, comprising:
   a bracket mount structure co figured to mount to a support structure;
   a bracket with a first end, a second end, and a trough support surface, the first end of the bracket being pivotally mounted to the bracket mount structure at a bracket angle;
   a fiber optic cable trough su ported on the bracket;
   a vertically oriented adjustment screw threaded into one of the trough and the bracket, a terminal end of the adjustment screw abutting the other of the trough and the bracket; and
   wherein rotation of the screw alters the bracket angle.

7. A fiber optic cable rough bracket as recited in claim 6, and further wherein the bracket mount structure includes an open support structure aperture, such that the bracket mount structure may be installed on a vertical support structure by horizontal movement of the bracket mount structure around the support structure.

8. A fiber optic cable trough bracket, comprising:
- a means to mount the bracket to a support structure in a cantilever mounting configuration;
- trough support means wit a first end, a second end, the first end of the trough support means being pivotally mounted to the means to mount the bracket to a support structure, at a racket angle;
- a vertically oriented adjustment means on one of the means to mount the bracket and the trough sup ort means; and
- wherein adjusting the adjustment means alters the bracket angle.

9. A method for the assembly of an adjustable fiber optic cable trough bracket on a vertical facility support structure, comprising the following steps:
- providing a bracket mount structure with an open support structure aperture;
- providing a bracket with a fir t end, a second end, and a trough support surface;
- pivotally mounting the bracket to the bracket mount structure;
- horizontally moving the bracket mount structure around the vertical facility support structure; and
- securing the bracket mount structure to the vertical facility support structure.

* * * * *

UNITED STATES PATENT AND TRADEMARK OFFICE
CERTIFICATE OF CORRECTION

PATENT NO. : 6,631,874 B2
DATED : October 14, 2003
INVENTOR(S) : Turpin et al.

It is certified that error appears in the above-identified patent and that said Letters Patent is hereby corrected as shown below:

Column 6,
Line 36, replace "bracket angle and wherein t e bracket is cantilever" with
-- bracket angle and wherein the bracket is cantilever --
Line 51, replace "a bracket mount structure co figured to mount to a support" with
-- a bracket mount structure configured to mount to a support --
Line 57, replace "a fiber optic cable trough su ported on the bracket;" with
-- a fiber optic cable trough supported on the bracket; --
Line 62, replace "wherein rotation of the screws alters the bracket angle." with
-- wherein rotation of the adjustment screw alters the bracket angle. --
Line 63, replace "7. A fiber optic cable rough bracket as recited in claim 6," with
-- 7. A fiber optic cable trough bracket as recited in claim 6, --

Column 7,
Line 7, replace "trough support means wit a first end, a second end, the" with
-- trough support means with a first end, a second end, the --
Line 10, replace "structure, at a racket angle;" with -- structure, at a bracket angle --
Line 12, replace "means to mount the bracket and the trough sup ort" with
-- means to mount the bracket and the trough support --

Column 8,
Line 36, replace "providing a bracket with a fir t end, a second end, and a" with
-- providing a bracket with a first end, a second end, and a --

Signed and Sealed this

Twenty-second Day of June, 2004

JON W. DUDAS
*Acting Director of the United States Patent and Trademark Office*